United States Patent
Li et al.

(10) Patent No.: US 8,422,233 B2
(45) Date of Patent: Apr. 16, 2013

(54) MOTHERBOARD SYSTEM HAVING HEAT DISSIPATING DEVICE

(75) Inventors: Ji-Chao Li, Shenzhen (CN); Bo Deng, Shenzhen (CN); Xiao-Feng Cao, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 121 days.

(21) Appl. No.: 12/982,906

(22) Filed: Dec. 31, 2010

(65) Prior Publication Data
US 2012/0147554 A1     Jun. 14, 2012

(30) Foreign Application Priority Data
Dec. 9, 2010   (CN) .......................... 2010 1 0580891

(51) Int. Cl.
*H05K 7/20*     (2006.01)
(52) U.S. Cl.
USPC ........... 361/720; 361/707; 361/710; 257/718; 439/78; 439/487

(58) Field of Classification Search .......... 361/704–722, 361/760–761
See application file for complete search history.

(56) References Cited

U.S. PATENT DOCUMENTS

| | | | |
|---|---|---|---|
| 6,330,745 B1 * | 12/2001 | Cromwell et al. | 29/832 |
| 6,545,879 B1 * | 4/2003 | Goodwin | 361/807 |
| 6,859,367 B2 * | 2/2005 | Davison | 361/704 |
| 7,924,566 B2 * | 4/2011 | Nie et al. | 361/710 |
| 8,120,920 B2 * | 2/2012 | Fan et al. | 361/719 |
| 2007/0139893 A1 * | 6/2007 | Sun | 361/705 |

* cited by examiner

*Primary Examiner* — Courtney Smith
(74) *Attorney, Agent, or Firm* — Altis Law Group, Inc.

(57) ABSTRACT

A motherboard system includes a PCB, a CPU socket mounted on the PCB, a heat dissipating device, and a number of fastening devices. The CPU socket is configured for receiving a CPU. The heat dissipating device is mounted on the CPU socket for dissipating heat generated by the CPU. The fastening devices extend through the heat dissipating device and the CPU socket and are engaged in the PCB, thereby fastening the heat dissipating device, and the CPU socket to the PCB.

10 Claims, 4 Drawing Sheets

MOTHERBOARD SYSTEM HAVING HEAT DISSIPATING DEVICE

BACKGROUND

1. Technical Field

The present disclosure relates to motherboard systems, and more especially, to a motherboard system having a heat dissipating device.

2. Description of Related Art

A computer motherboard system includes a printed circuit board (PCB), and a central processing unit (CPU) socket mounted on the PCB. The CPU socket is fastened to the PCB with a number of first screw bolts. When a CPU is installed in the CPU socket of the motherboard system, a heat dissipating device, such as a heat sink, is arranged to touch the CPU for dissipating heat generated from the CPU. Generally, the heat sink is fastened to the PCB by a number of second screw bolts. The screw holes are always arranged around the CPU socket. Therefore, some regions of the PCB corresponding to the screw holes cannot be wired. When there are a large number of wires on the PCB, there is very little area left for the heat dissipation device to be installed. Therefore the wires must be designed to be added as close as possible making the layout of the PCB very dense. This causes more difficult wiring design and harder installation of the wires on the PCB, which may lead to unstable working conditions of the motherboard system.

Therefore, there is a need for a motherboard system having a heat dissipating device, to overcome the above mentioned limitations.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the views.

DETAILED DESCRIPTION

Figure 1:
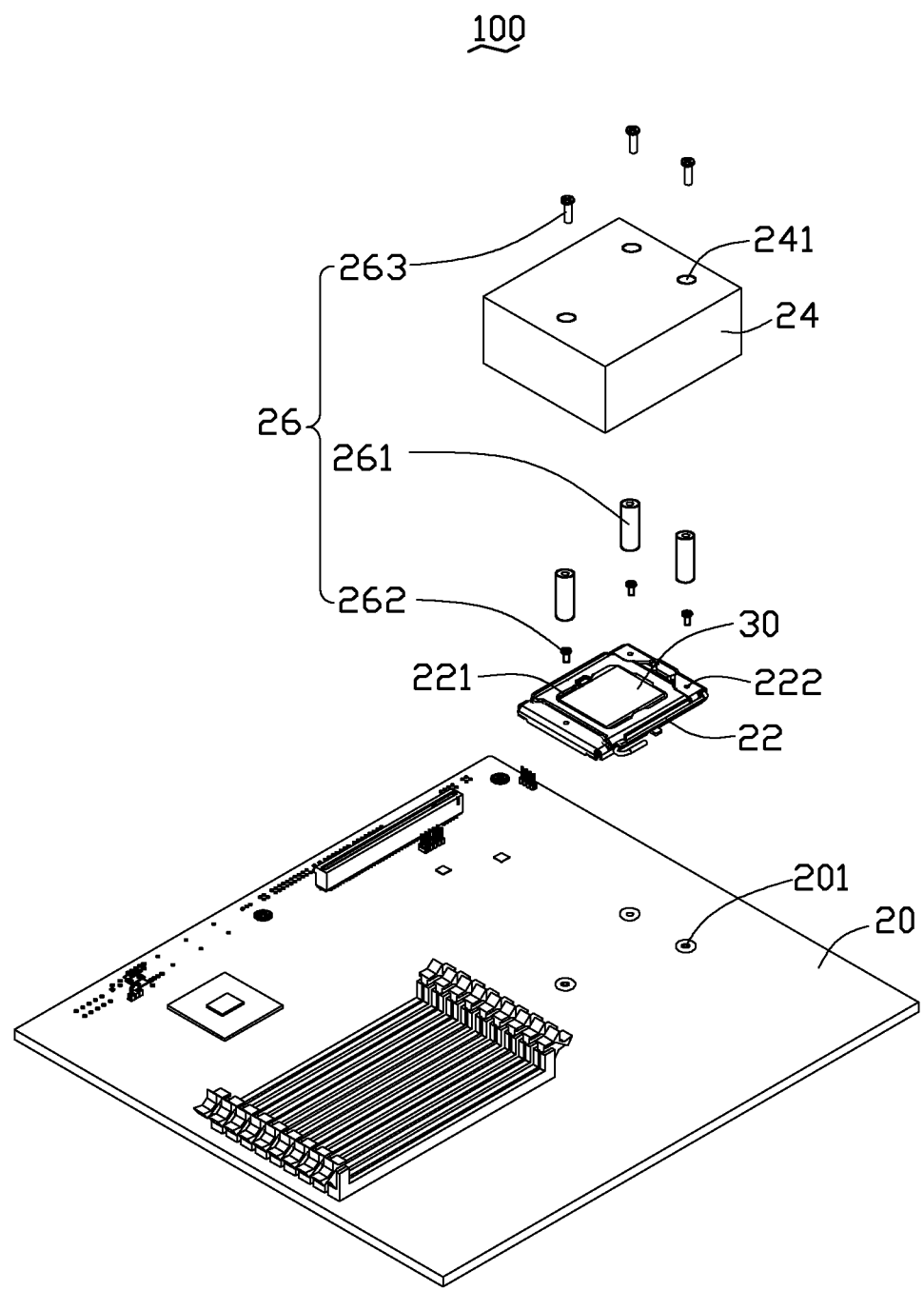
FIG. 1 is an isometric, exploded view of a motherboard system in accordance with an exemplary embodiment.
Figure 2:
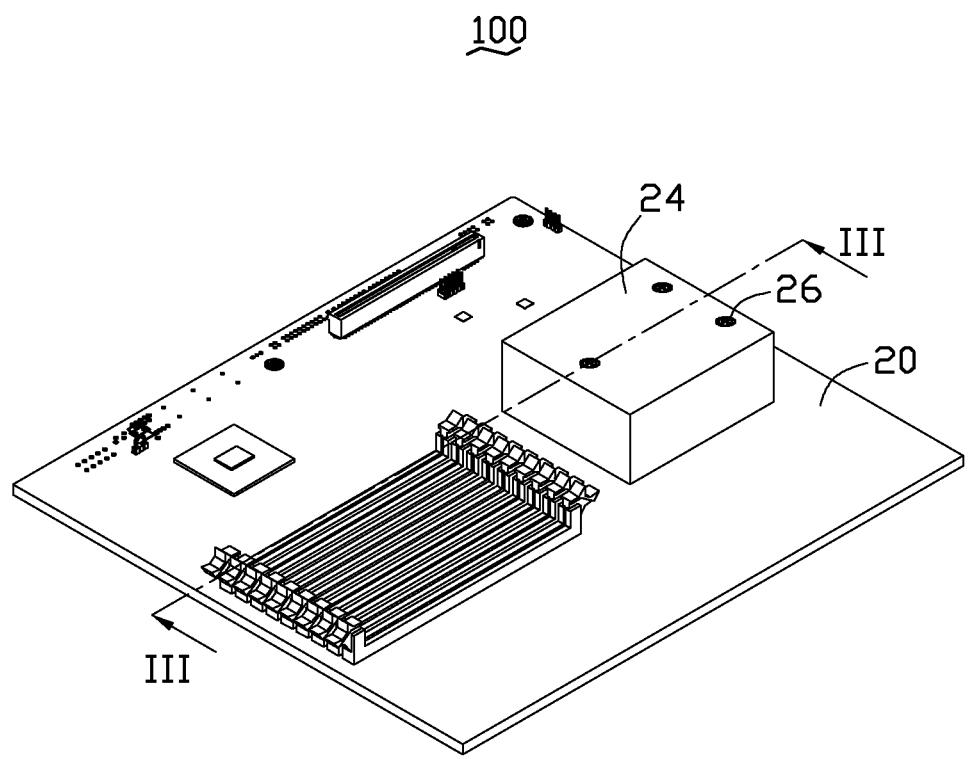
FIG. 2 is an isometric, assembled view of the motherboard system of FIG. 1.
Figure 3:
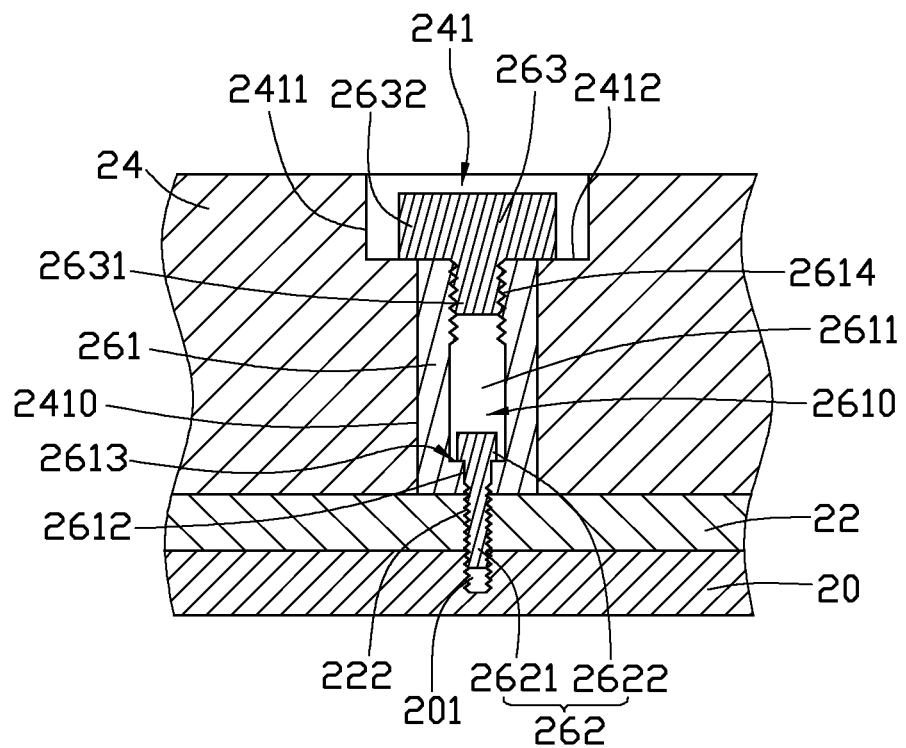
FIG. 3 is a sectional view of the motherboard system of FIG. 2, taken along line III-III and showing a fastening device fastening a heat dissipating device, a CPU socket, and a PCB together.

Referring to FIGS. 1 to 3 a motherboard system 100 in accordance with an exemplary embodiment includes a PCB 20, a CPU socket 22 attached on and electrically connected to the PCB 20, a heat dissipating device 24 and a plurality of fastening devices 26.

The PCB 20 includes a plurality of wires (not shown) therein, and electrically connects functional elements of a computer, such as a CPU, memory chips and hard disk drives, to each other, thereby making the computer properly functional. The PCB 20 defines three first screw holes 201 that are located at the three vertices of an imaginary triangle, in this embodiment, an isosceles triangle.

The CPU socket 22 defines a receiving recess 221 at the center thereof. The receiving recess 221 receives a CPU 30. The CPU socket 22 further defines three second screw holes 222 corresponding to the three screw holes 201 around the receiving recess 221. The three second screw holes 222 are respectively aligned with the three first screw holes 201. In this embodiment, the first and second screw holes 201 and 222 have an equal diameter.

The heat dissipating device 24 dissipates heat generated by the CPU 30. The heat dissipating device 24 defines three first stepped holes 241 corresponding to the three first screw holes 201 and the three second screw holes 222. The first stepped hole 241 includes a first hole portion 2410 and a second hole portion 2410 in communication with each other. In this embodiment, the first and second holes 2410 and 2411 are cylindrical holes, and are coaxial. A diameter of the first hole portion 2410 is less than that of the second hole portion 2410, thereby forming a step surface 2412 at an interface between the first hole portion 2410 and second hole portion 2410.

The number of the fastening device 26 is three, corresponding to the number of the first stepped holes 241. Each of the fastening device 26 includes a cylindrical connection member 261, a first bolt 262, and a second bolt 263. The connection member 261 has an outer diameter substantially equal to or slightly less than a diameter of the first hole portion 2410, has a length substantially equal to or slightly less than the depth of the first hole portion 2410. The connection member 261 defines a second stepped hole 2610 along the central axis thereof. The stepped hole 2610 includes a cylindrical third hole portion 2611, and a cylindrical fourth hole portion 2612 in communication with and coaxial to the cylindrical third hole portion 2611. The third hole portion 2611 has a diameter larger than that of the fourth hole portion 2612, thereby forming a step surface 2613 at the interface between the third hole portion 2611 and the fourth hole portion 2612. In addition, the diameter of the fourth hole portion 2612 is larger than the diameter of first and second screw holes 201 and 222. In this embodiment, the third hole portion 2611 is deeper than the fourth hole portion 2612. The connection member 261 further includes a screw thread 2614 formed at an end of in the third hole portion 2611 away from the fourth hole portion 2612.

The first bolt 262 includes a first threaded shank portion 2621, and a first head portion 2622 extending from a periphery of one end of the first threaded shank portion 2612. The first threaded shank portion 2621 is engaged with the first and second screw holes 201 and 222 being partly received in the first and second screw holes 201 and 222. An outline of the first head portion 2622 forms an area larger than an opening of the fourth hole portion 2612, thus the first head portion 2622 can abut against the step surface 2613 when the first threaded shank portion 2621 is threadedly engaged in the first screw hole 201 and the second screw hole 222.

The second bolt 263 includes a second threaded shank portion 2631 and a second head portion 2632 extending from a periphery of one end of the second threaded shank portion 2631. The second threaded shank portion 2631 is engaged with the screw thread 2614 being partly received in the third hole portion 2611. An outline of the second head portion 2632 forms an area larger than an opening of the third hole portion 2611, thus the second head portion 2632 can abut against the step surface 2412 when the second threaded shank portion 2631 is threadedly engaged in third hole portion 2611.

In use, the CPU socket 22 is mounted on the PCB 20 with the three second screw holes 222 respectively aligned with the three first screw hole 201. Then the three connection members 261 are placed on the CPU socket 22 with the fourth holes 2612 are respectively in communication with and aligned with the second screw holes 222. Each of the first bolts 262 is inserted in the respective fourth hole portion 2612, and then threadedly engaged in the respective second screw hole 222 and the respective first screw hole 201. After that, the first head portions 2622 abuts against the respective step surface 2613 of the connection member 261, thus the CPU socket 22 is fixed firmly to the PCB 20. Further then the CPU 30 is arranged in the receiving recess 221.

The heat dissipating device 24 is arranged on the CPU socket 22 with the connection members 261 respectively received in the first hole portion 2410, thus the heat dissipating device 24 presses the CPU socket 22 and the CPU 30. Then the second bolts 263 are threadedly engaged in the respective third holes 2611, and the second head portions 2632 abut against the respective step surface 2412. Thus the heat dissipating device 24 firmly presses the CPU socket 22 and the CPU 30. That is, the heat dissipating device 24 is firmly fixed to the CPU socket 22 and the PCB 20.

In alternative embodiments, the number of the first and second screw holes 201 and 221, the stepped hole 241 and the fastening device 26 can be two or more than three, as long as the CPU socket 22 and the heat dissipating device 24 can be fixed firmly to the PCB 20.

In the motherboard system 100 of the embodiments, both of the CPU socket 22 and the heat dissipating device 24 are fixed to the PCB 20 by the fastening device 26. Screw holes in the PCB 20 around the CPU socket 22 are omitted. Therefore, the wiring design of the PCB 20 becomes easy. In addition, spacing between adjacent wires of the PCB 20 becomes larger, thus the motherboard system 100 performs more efficiently.

Figure 4:
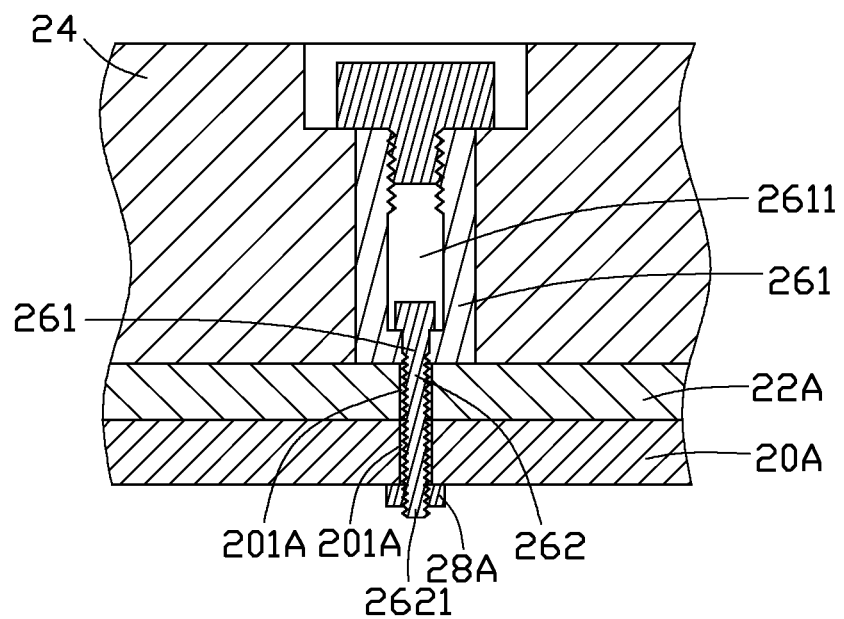
FIG. 4 is an assembled, sectional view of a motherboard system in accordance with an alternative embodiment.

Referring to FIG. 4, in another alternative embodiment, a PCB 20A defines three first through holes 201A, and three CPU socket 22A defines a second through hole 222A aligned with the respective first through holes 201A. The first and second through holes 201A and 222A each have a diameter larger than that of the first threaded shank portion 2621 of the first bolt 262. The first threaded shank portion 2621 of the first bolt 262 extends through the second through hole 222A and the first through hole 201A, and is engaged in a nut 28A. The nut 28A is located on an opposite side of the PCB 20A to the CPU socket 22A, and presses tightly to the PCB 20A.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A motherboard system, comprising:
a printed circuit board (PCB), the PCB defining a plurality of first holes;
a central processing unit (CPU) socket mounted on the PCB for receiving a CPU, the CPU socket defining a plurality of second holes aligned with the respective first holes;
a heat dissipating device mounted on the CPU socket for dissipating heat generated by the CPU, the heat dissipating device defining a plurality of third holes respectively aligned with the second holes, each third hole being a stepped hole, and each third hole comprising a first hole portion, a second hole portion aligned with and in communication with the first hole portion, and a first step surface formed between the first and second hole portions, the first hole portion having a diameter less than a diameter of the second hole portion; and
a plurality of fastening devices, each fastening device comprising a first fixing portion, a connection member, and a second fixing portion;
wherein the fastening devices extend through the corresponding third holes of the heat dissipating device and the second holes of the CPU socket, and are fixed in the corresponding first holes of the PCB;
the connection members extend through the heat dissipating device and terminate at the CPU socket, and are received in the corresponding second hole portions of the third holes;
the first fixing portions and the second fixing portions are connected to opposite ends of the corresponding connection members, each first fixing portion is inserted in the corresponding second hole and the corresponding first hole for fixing the PCB and the CPU socket together, and each second fixing portion abuts against the corresponding first step surface to fix the heat dissipating device to the CPU socket, thereby fastening the heat dissipating device and the CPU socket to the PCB.

2. The motherboard system of claim 1, wherein each of the connection members is a sleeve defining an inner stepped hole along a longitudinal axis thereof, the inner stepped hole comprising a first hole section and a second hole section aligned with and in communication with the first hole section, and the first hole section having a diameter larger than a diameter of the second hole section, thereby forming a second step surface between the first and second hole sections; the first fixing portion comprises a first threaded shank portion and a first head portion, the first head portion is received in the first hole section and abuts against the second step surface, and the first threaded shank portion extends through the second hole section of the inner stepped hole, the second hole and the first hole to threadedly engage in the first hole; and the second fixing portion comprises a second threaded shank portion and a second head portion, the second threaded shank portion is threadedly engaged in the corresponding first hole section, and the second head portion abuts against the corresponding first step surface.

3. The motherboard system of claim 2, wherein the first and second holes are screw holes having the respective first threaded shank portions engaged therein.

4. The motherboard system of claim 2, wherein the fastening device further comprises a plurality of nuts engaged with the respective first threaded shank portions, the nuts located on an opposite side of the PCB to the CPU socket.

5. A motherboard system, comprising:
a printed circuit board (PCB);
a central processing unit (CPU) socket mounted on the PCB for receiving a CPU;
a heat dissipating device mounted on the CPU socket for dissipating heat generated by the CPU, the heat dissipating device defining a plurality of first holes; and
a plurality of fastening devices, each fastening device comprising a first fixing portion, a connection member and a second fixing portion;
wherein the fastening devices extend through the heat dissipating device and the CPU socket, and are engaged in the PCB;
the connection members extend through the heat dissipating device and are received in the corresponding first holes of the heat dissipating device, each connection member comprises a first end and a second end opposite to the first end, the first end of the connection member terminates at the CPU socket, and the second end of the connection member is coplanar with a surface of the heat dissipating device;

the first fixing portions and the second fixing portions are connected to the first and second ends of the corresponding connection members, respectively; and each first fixing portion extends through the CPU socket and the PCB to fix the PCB and the CPU socket together, and each second fixing portion abuts against the surface that is coplanar to the second end of the connection member to fix the heat dissipating device to the CPU socket, thereby fastening the heat dissipating device and the CPU socket to the PCB.

6. The motherboard system of claim 5, wherein the CPU socket defines a plurality of second holes, the PCB defines a plurality of third holes aligned with the respective second holes, the second and third holes are aligned with the respective first holes, and each first fixing portion is inserted in the corresponding second hole and the corresponding third hole for fixing the PCB and the CPU socket together.

7. The motherboard system of claim 6, wherein each first hole is a stepped hole and includes a first hole portion and a second hole portion aligned with and in communication with the first hole portion, the first hole portion has a diameter less than a diameter of the second hole portion, the corresponding connection member is received in the second hole portion of the first hole, and the surface that is coplanar with the second end of the connection member is formed between the first and second hole portions.

8. The motherboard system of claim 7, wherein each of the connection members is a sleeve defining an inner stepped hole along a longitudinal axis of the sleeve, the inner stepped hole comprises a first hole section and a second hole section aligned with and in communication the first hole section, and the first hole section has a diameter greater than a diameter of the second hole section, thereby forming a step surface between the first and second hole sections; the first fixing portion comprises a first threaded shank portion and a first head portion, the first head portion is received in the first hole section and abuts against the step surface, and the first threaded shank portion extends through the second hole section of the inner stepped hole, the second hole and the third hole to threadedly engage in the third hole; and the second fixing portion comprises a second threaded shank portion and a second head portion, the second threaded shank portion is threadedly engaged in the corresponding first hole section, and the second head portion abuts against the surface which is coplanar with the second end of the connection member.

9. The motherboard system of claim 8, wherein the second and third holes are screw holes having the respective first threaded shank portions engaged therein.

10. The motherboard system of claim 8, wherein the fastening device further comprises a plurality of nuts engaged with the respective first threaded shank portions, the nuts located on an opposite side of the PCB to the CPU socket.

* * * * *